US005229763A

United States Patent [19]

Nakamaru

[11] Patent Number: 5,229,763

[45] Date of Patent: Jul. 20, 1993

[54] REMOTE CONTROLLER WITH LEARNING FUNCTION

[75] Inventor: Noboru Nakamaru, Tokyo, Japan

[73] Assignee: Pioneer Electronic Corporation, Tokyo, Japan

[21] Appl. No.: 666,773

[22] Filed: Mar. 8, 1991

[30] Foreign Application Priority Data

Mar. 13, 1990 [JP] Japan .................................. 2-62046

[51] Int. Cl.$^5$ .............................................. H04Q 9/00

[52] U.S. Cl. ............................ 340/825.72; 358/194.1; 359/148

[58] Field of Search ...................... 340/825.22, 825.69, 340/825.72; 359/148; 358/194.1

[56] References Cited

U.S. PATENT DOCUMENTS 4,728,949 3/1988 Platte et al. .................... 340/825.69

4,807,052 2/1989 Amano ............................ 359/148 X

FOREIGN PATENT DOCUMENTS 0289625 11/1987 European Pat. Off. .

OTHER PUBLICATIONS

Japanese Abstract 63-290096; vol. 13, No. 121, Mar. 24, 1989; application published Nov. 11, 1988.

*Primary Examiner*—Donald J. Yuskò

*Assistant Examiner*—Michael Horabik

*Attorney, Agent, or Firm*—Sughrue, Mion, Zinn, Macpeak & Seas

[57] ABSTRACT

A remote controller with learning function having first and second storage circuits, an operating unit with a plurality of operating keys, and input and output circuits, wherein the learned remote control signals are not stored in correspondence with the operating keys but with signals for reading out the learned remote control signals in the second storage circuit, the learned remote control signals can be output by operating the keys capable of specifying any of the signals identical with the signal for reading out or by inputting a signal identical with the signal for reading out from the exterior. Both the remote control signal to learn and the signal for reading out the learned remote control signal may be external signals fed from the exterior, a number of remote control signals to learn can be increased independent of a number of operating keys, and remote control signals through different transmission media can also be used for learning as well as for signal conversion. The remote control signal to learn and the signal for use in the remote control may be different signals and the signal for reading out the learned remote control signal may also be a signal fed from the exterior.

4 Claims, 18 Drawing Sheets

FIG. 4A

| ROM | |
|---|---|
| $K_1$ AREA | $X_1$ |
| $K_2$ AREA | $X_2$ |
| | |

FIG. 4B

| RAM | |
|---|---|
| INFORMATION $X_1$ FOR IDENTIFYING KEY $K_1$ | $D_1$ |
| | |
| | |

FIG. 6A

| RAM | |
|---|---|
| $R2_1$ | $R1_1$ |
| | |
| | |

FIG. 6B

| ROM | |
|---|---|
| $K_n$ AREA | $R2_1$ |
| | |
| | |

FIG. 8A

| ROM | | | |
|---|---|---|---|
| ROM 1 | | ROM 2 | |
| $K_1$ AREA | $X_1$ | $K_1$ AREA | $X'_1$ |
| $K_2$ AREA | $X_2$ | $K_2$ AREA | $X'_2$ |
| | | | |

FIG. 8B

| RAM | |
|---|---|
| INFORMATION $X_2$ FOR IDENTIFYING KEY $K_2$ | $X'_1$ |
| | |
| | |

FIG. 10A

| ROM | | | |
|---|---|---|---|
| ROM 1 | | ROM 2 | |
| $K_1$ AREA | $X_1$ | $K_1$ AREA | $X'_1$ |
| $K_2$ AREA | $X_2$ | $K_2$ AREA | $X'_2$ |
| | | | |

FIG. 10B

| RAM | |
|---|---|
| $R1_1$ | $X'_1$ |
| | |
| | |

REMOTE CONTROLLER WITH LEARNING FUNCTION

BACKGROUND OF THE INVENTION

1. Field of Invention

The present invention relates to a remote controller and, more specifically, to a remote controller with a learning function which is capable of providing new remote control signals by reading stored control signals through learning.

2. Description of the Prior Art

A remote controller with a learning function, as shown in FIG. 1 has been proposed. The known remote controller has been furnished with a receiving function, which enables the remote controller to receive remote control signals transmitted by another remote controller, operating keys and corresponding storage regions. In the known remote controller with the learning function, the remote control signals transmitted by another remote controller are received and stored in the respective storage regions that correspond to the specific operating keys, and thereby any stored remote control signal can be transmitted by the operation of the corresponding operating key of the known controller.

As shown in FIG. 1, the known remote controller with learning function comprises a microcomputer (hereinafter referred to as "CPU") 1 which performs operational steps in accordance with a prepared control program and having a register 1a or the like. Connected to the CPU 1 are a read-only memory (ROM) 2 for storing the control program and remote control signals, a random access memory (RAM) 3 for writing information thereinto or reading information therefrom by the CPU 1, a signal receiving unit 4 for receiving remote control signals from another remote controller (not shown), a signal transmitting unit 5 for transmitting remote control signals read from the ROM 2 or the RAM 3 by the CPU 1, a mode changeover switch 6 for changing the operating mode of the remote controller between a learning mode and a transmission mode, and an operating unit 7 having a plurality of operating keys.

In accordance with the prior art remote controller, a remote control signal received by the receiving unit 4 from another remote controller, after being switched to the learning mode by the operation of the mode changeover switch 6, is stored temporarily in the register 1a. By operating a specific key of the operating unit 7, the remote control signal temporarily stored in the register 1a is transferred to the RAM 3 and stored in a storage region where corresponds to the operated key. Hence, by operating said specific key of the operating unit 7, after being switched to the transmitting mode by the mode changeover switch 6, the signal stored in the storage region of the RAM 3 can be transmitted by the transmitting unit 5 as a new remote control signal.

According to the above described remote controller with learning function, it is possible to carry out a remote control operation, simply, by operating the operating key of a (universal) remote controller, while the rest of prior art remote controllers with learning functions have utilized a plurality of remote controllers in order to achieve the same result, thus resulting in the improvement of operability of the remote controller.

However, in accordance with the above described remote controller with learning function, the operating keys are indispensable to perform the operation as it requires the operating keys for learning as well as controlling the remote controller. Further, since new remote control signals are stored in respective storage regions that correspond to the operating keys, it is required for the remote controller to furnish a number of operating keys with the same number of remote control signals to be learned, this in turn limits the number of control signals that can be learned to the number of the operating keys of the remote controller.

Accordingly, it has been necessary for the remote controller to provide operating keys as required by a number of remote control signals, thus resulting in the increase in size of the remote controller and the increase in number of operating keys, thereby requiring complicated operation.

It is therefore an object of this invention to provide a remote controller with a learning function, capable of learning new remote control signals without using any operating key, and of transmitting the learned remote control signals through a simple operation other than the operation of the keys.

It is another object of this invention to provide a remote controller with a learning function, capable of increasing a number of remote control signals to learn irrelevant to the number of operating keys, and of learning as well as performing signal conversion of remote control signals through different transfer media.

SUMMARY OF THE INVENTION

In order to achieve the first object of this invention, there is provided a remote controller with a learning function as shown in FIG. 2A comprising an operating unit 17 having a plurality of operating keys, a first storage circuitry 12 having storage regions which correspond to respective operating keys of the operating unit 17 and storing respective remote control signals beforehand, an input circuitry 14 or 18 for inputting signals from the exterior of the remote controller, a second storage circuitry 13 for storing correspondingly the remote control signal read from the first storage circuitry 12 by operating the operating key of the operating unit 17 and a first signal fed by the input circuitry 14 or 18, and an output circuitry 15 or 19 for outputting the first signal read from the second storage circuitry 13 in response to the operation of the operating key of the operating unit, which operating key corresponds to the remote control signal stored in the second storage circuitry 13, or in response to the input of a signal, which is equal to the remote control signal stored in the second storage circuitry 13, to the input circuitry 14 or 18.

In order to achieve the first and second objects of the invention, there is provided a remote controller with learning function as shown in FIG. 2B comprising an operating unit 17 having a plurality of operating keys, a first storage circuitry 12 having storage regions which correspond to the respective operating keys of the operating unit 17 and storing respective remote control signals beforehand, an input circuitry 14 or 18 for inputting signals from the exterior, a second storage circuitry 13 for storing correspondingly the first and second signals fed by the input circuitry 14 or 18, and an output circuitry 15 or 19 for outputting the second signal read from the second storage circuitry 13 in response to the input of a signal, which is equal to the first signal stored in the second storage circuitry 13, to the input circuitry 14 or 18, or in response to the operation of the operating key of the operating unit 17, which operating key corresponds to the storage region of the first storage circuitry 12 storing the same signal as the first signal being stored in the second storage circuitry 13.

Further, in order to achieve the first object of this invention, there is provided a remote controller with learning function as shown in FIG. 2C comprising an operating unit 17 having a plurality of operating keys, a first storage circuitry 12 having storage regions which correspond to the respective operating keys of the operating unit 17 and storing respective remote control signals and signals different from these remote control signals in advance, an input circuitry 14 or 18 for inputting a signal from the exterior, a second storage circuitry 13 for storing correspondingly the remote control signal and the signal, which is different from the remote control signal, read from the first storage circuitry 12 by operating the operating key of the operating unit 17 in twice, and an output means 15 or 19 for outputting the signal read from the second storage circuitry 13 in response to the operation of the operating key of the operating unit 17, which operating key corresponds to the remote control signal stored in the second storage circuitry 13, or in response to the input of a signal, which is equal to the remote control signal stored in the second storage circuitry 13, to the input circuitry 14 or 18.

Still further, in order to achieve the first and second objects of the invention, there is provided a remote controller with learning function as shown in FIG. 2D comprising an operating unit 17 having a plurality of operating keys, a first storage circuitry 12 having storage regions which correspond to the respective operating keys of the operating unit 17 and storing remote control signals and signals different from these remote control signals in advance, an input circuitry 14 or 18 for inputting a signal from the exterior, a second storage circuitry 13 for storing correspondingly a first signal fed by the input circuitry 14 or 18 and the signal, which is different from the remote control signal, read from the first storage means by operating the operating key of the operating unit 17, and an output circuitry 15 or 19 for outputting the signal being stored in the second storage circuitry 13 in response to the input of a signal, which is equal to the first signal stored in the second storage circuitry 13, to the input circuitry 14 or 18, or in response to the operation of the operating key corresponding to the storage region of the first storage circuitry 12, which storage region is storing the same signal as the first signal stored in the second storage circuitry 13.

In the remote controllers with learning function shown in FIGS. 2A, 2B, 2C and 2D, since the learned remote control signals are not stored correspondingly with the operating keys but with signals for reading out the learned remote control signals in the second storage circuitry 13, the learned new remote control signals can be output only by operating the operating keys capable of specifying any of the signals identical with the signal for reading out or by inputting a signal identical with the signal for reading out from the exterior. Thus, there is no need of providing any specific operating keys for reading out the learnt new remote control signals, and the the learnt new remote control signals can also be read by inputting any of the signals from the exterior for improving the operability of the remote controller with learning function.

Accordingly, in the remote controller with learning function shown in FIG. 2B, since the remote control signal to learn and the signal for reading out the learned remote control signal are both external signals fed from the exterior of the remote controller, a number of remote control signals to learn can be increased independent of a number of operating keys and remote control signals through different transmission media can also be used for learning as well as for signal conversion.

Still further, in the remote controller with learning function shown in FIG. 2D, since the remote control signal to learn and the signal for use in the remote control are different signals and the signal for reading out the learnt remote control signal is a signal fed from the exterior, a number of remote control signals to learn can also be increased independent of the number of operating keys.

BRIEF DESCRIPTION OF THE DRAWINGS

FIGS. 4A and 4B are tables illustrating a first embodiment of this invention;

FIGS. 6A and 6B are tables illustrating a second embodiment of this invention;

FIGS. 8A and 8B are tables illustrating a third embodiment of this invention;

FIGS. 10A and 10B are tables illustrating a fourth embodiment of this invention.

DETAILED DESCRIPTION OF THE PREFERRED EMBODIMENTS

Preferred embodiments of the present invention will be described hereinafter with reference to the accompanying drawings.

Figure 1:
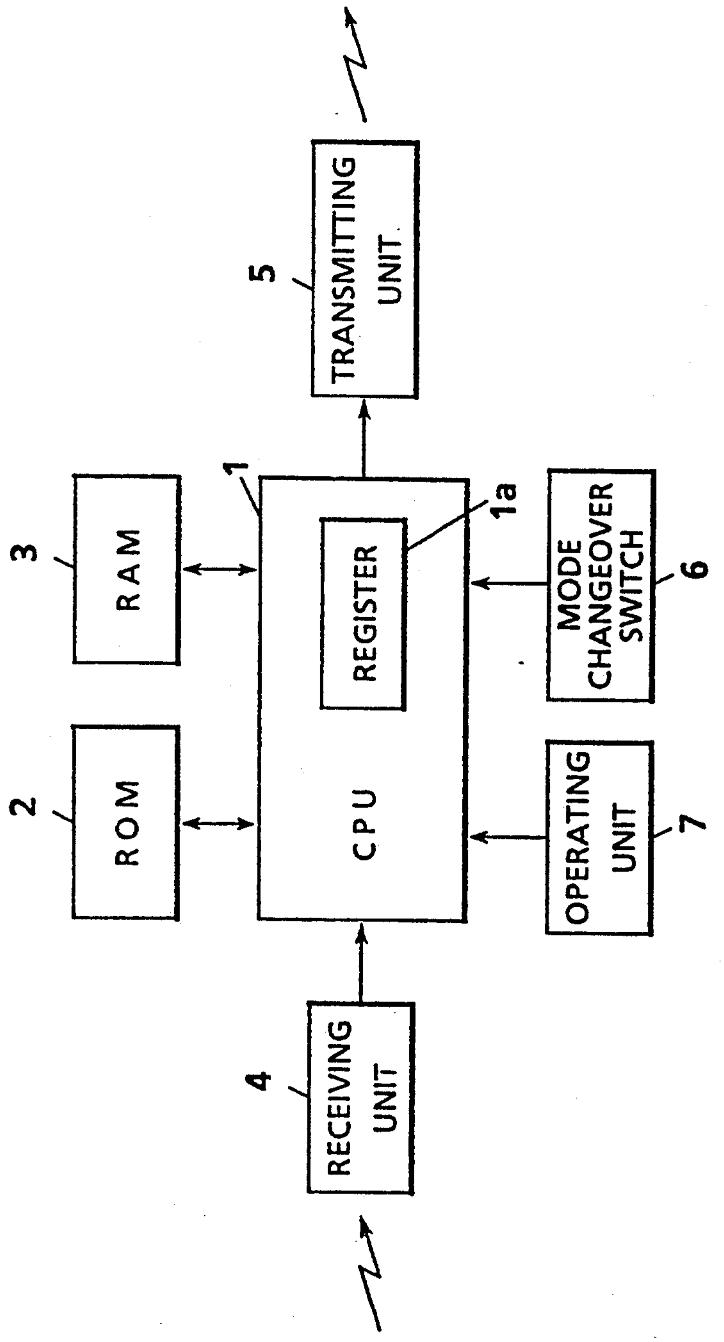
FIG. 1 PRIOR ART
FIG. 1 is a block diagram showing a conventional remote controller with learning function.
Figure 2A:
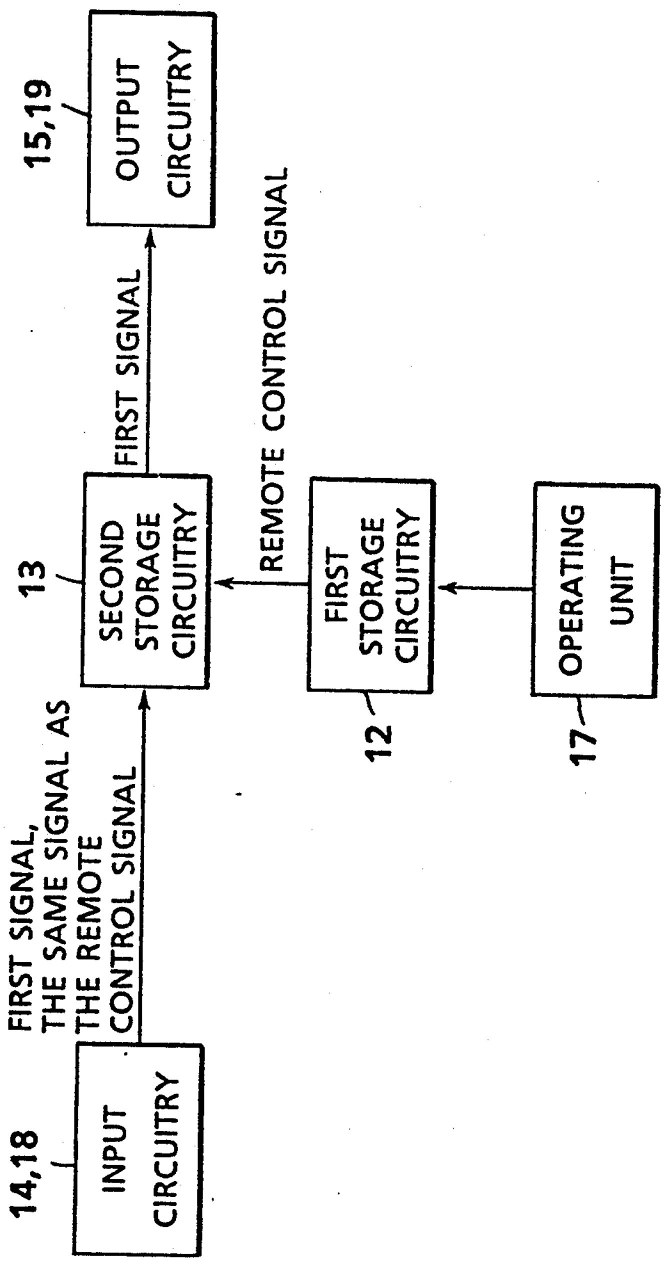
FIGS. 2A, 2B, 2C and 2D are block diagrams showing the basic constructions of remote controllers with learning function embodying the present invention.
Figure 2B:
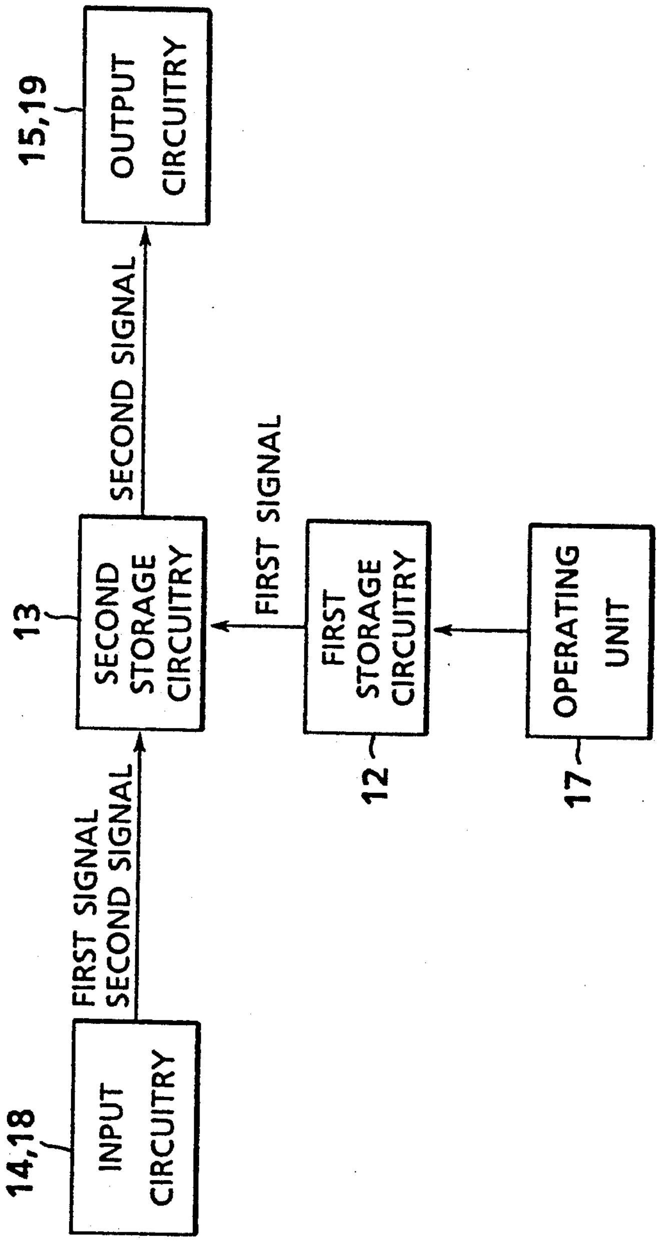
Figure 2C:
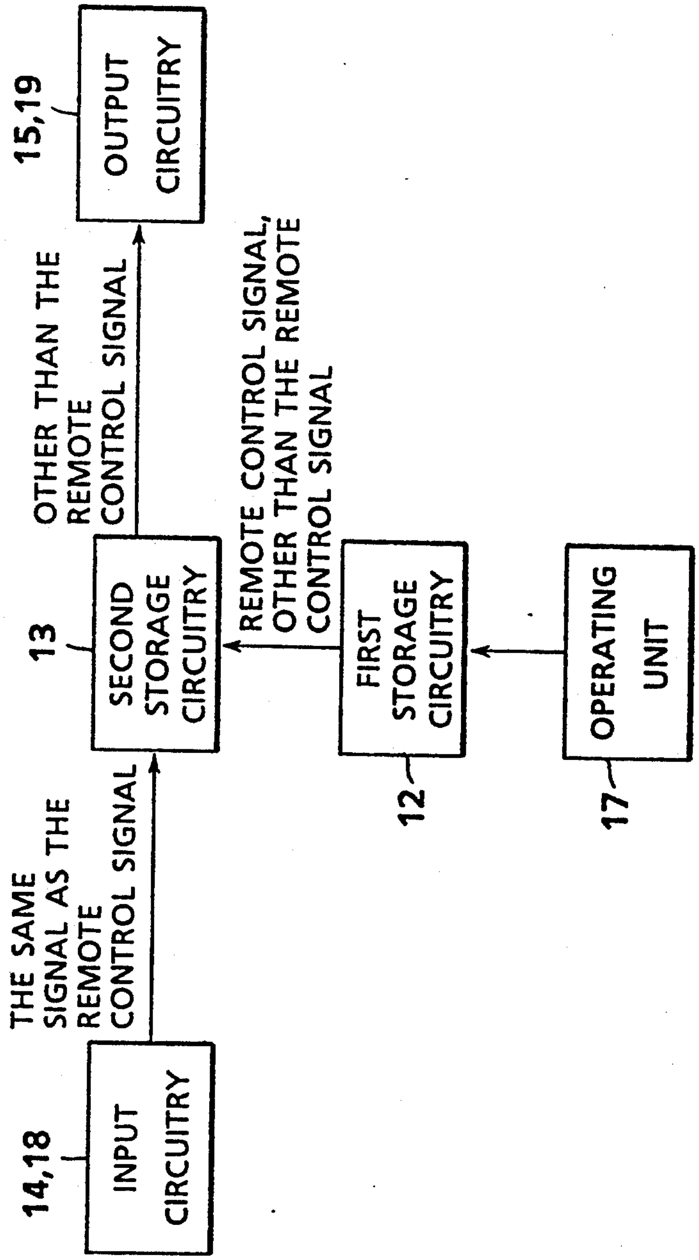
Figure 2D:
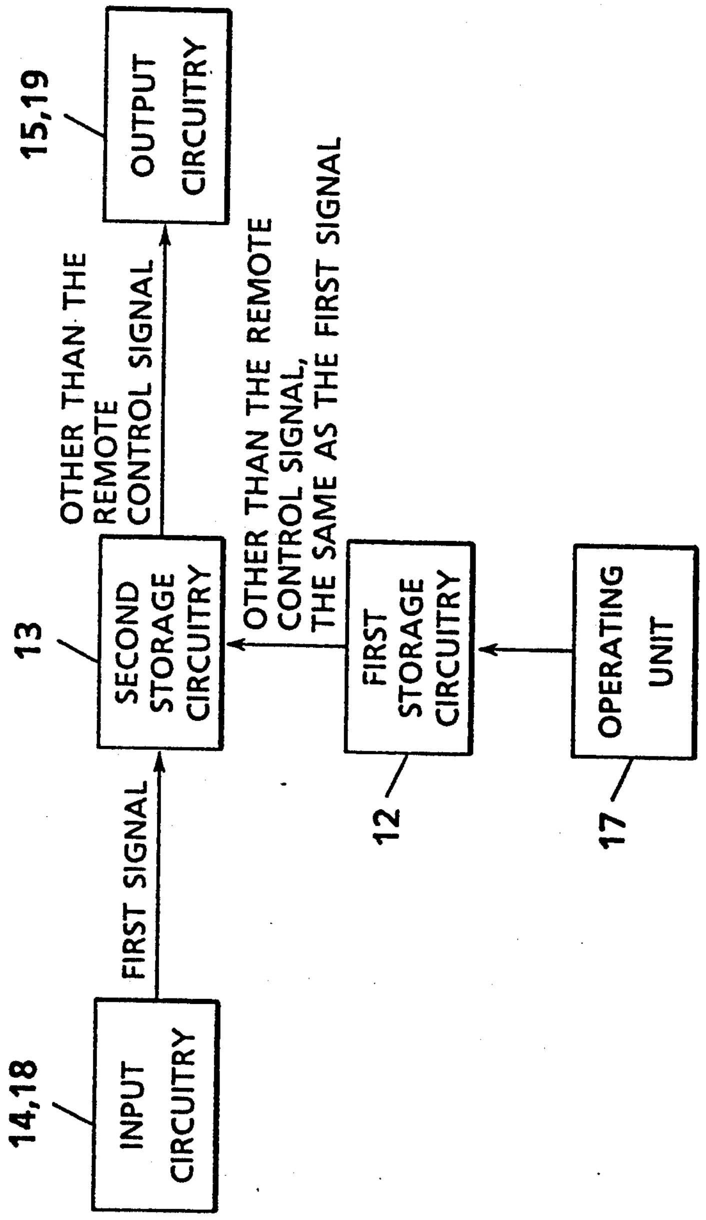
Figure 3:
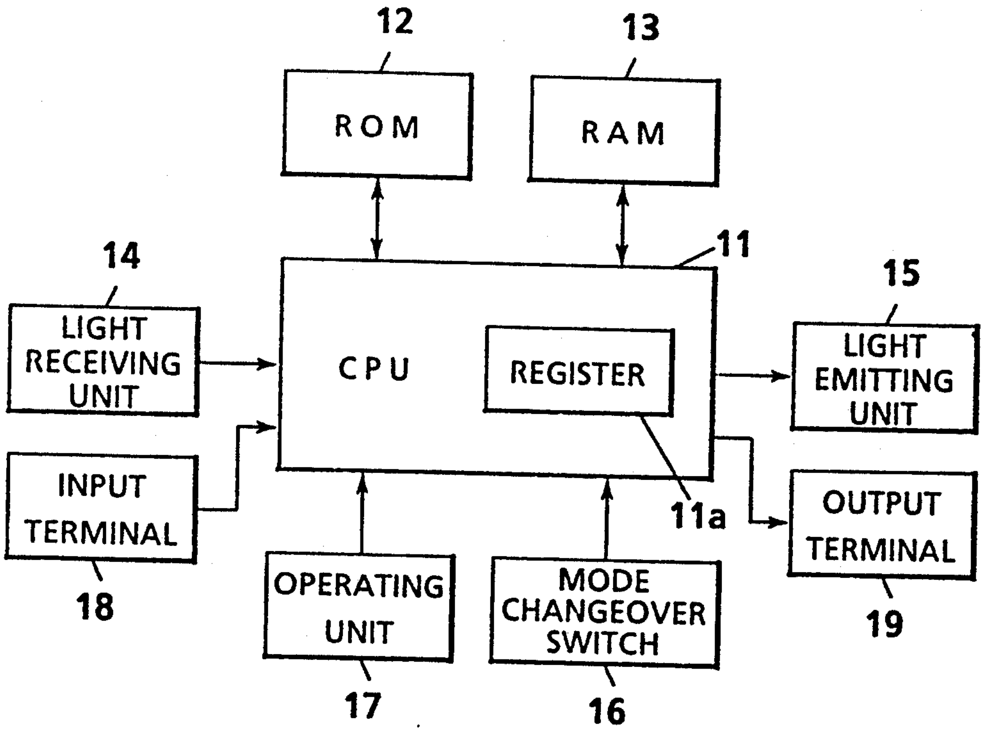
FIG. 3 is a block diagram showing a remote controller with learning function embodying the present invention.

Referring to FIG. 3, there is shown a remote controller with learning function in accordance with the present invention, the remote controller comprises a CPU 11 having a register 11*a* or the like to perform operations steps in accordance with prepared control programs shown in flowcharts illustrated in the accompanying drawings, which operational steps will be described below, a ROM 12 connected to the CPU 11 for storing the control programs, a RAM 13 connected to the CPU 11 for enabling the CPU 11 to write data therein and to read data therefrom, a light receiving unit 14 for receiving an infrared remote control signal from another remote controller (not shown), a light emitting unit 15 for emitting an infrared ray in order to transmit a remote control signal read from the ROM 12 or the RAM 13 through the CPU 11, a mode changeover switch 16 for changing the operating mode of the remote controller between a learning mode and a transmitting mode, an operating unit 17 having a plurality of operating keys, an input terminal 18 for receiving a signal, and an output terminal 19 for providing a remote control signal.

A first embodiment of this invention will be described with reference to the remote controller of FIG. 3. An infrared remote control signal $D_1$ is emitted by an external remote controller towards the light receiving unit 14 after setting the remote controller to a learning mode I by the mode changeover switch 16. The infrared remote control signal $D_1$ received by the light receiving unit 14 is stored temporarily in the register 11*a*. Then, the predetermined key of the operating unit 17 assigned for a predetermined function is operated after setting the remote controller to a learning mode II by the mode changeover switch 16. As shown in FIG. 4A, a signal $X_1$ is stored previously in a predetermined storage area $K_1$ of the ROM 12, which storage area $K_1$ corresponds to the aforesaid predetermined operating key.

In response to the operation of the predetermined key, the information $X_1$ for identifying the predetermined key and the signal $D_1$ temporarily stored in the register 11*a* are transferred to the RAM 13 and stored correspondingly therein as shown in FIG. 4B.

Subsequently, upon operating the predetermined key after setting the remote controller to a transmitting mode through the mode changeover switch 16, the signal $D_1$, which is stored in the RAM 12 correspondingly with the information $X_1$ for identifying the predetermined key, is read from the RAM 12 and the light emitting unit 15 emits an infrared remote control signal based on the read signal $D_1$.

Further, if a signal which is equal to the signal $X_1$ stored in the ROM 12 is fed to the input terminal 18 or to the light receiving unit 14, the signal $D_1$ corresponding to the signal $X_1$ is read from the RAM 13, the light emitting unit 15 will emit an infrared remote control signal based on the signal $D_1$.

Figure 5A:
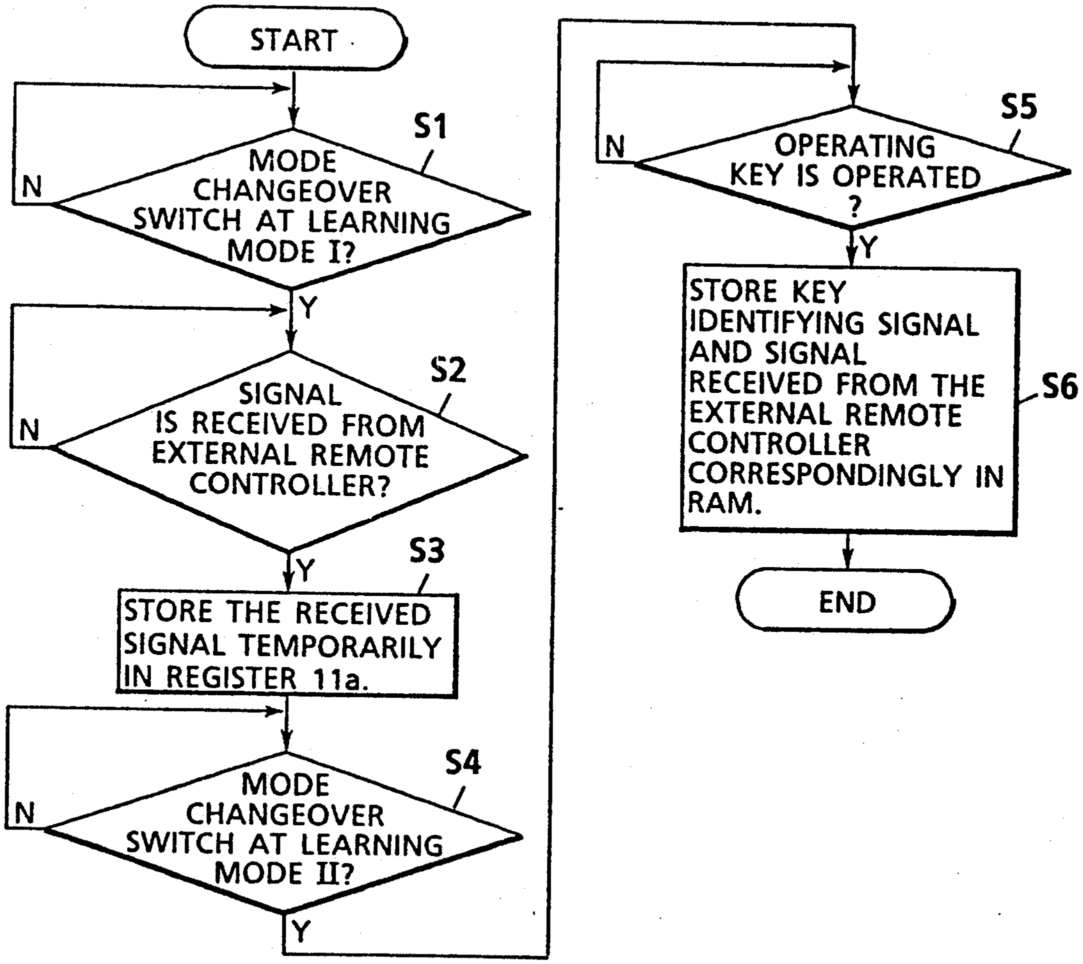
FIGS. 5A and 5B are flowcharts illustrating operational steps to be performed by a CPU of FIG. 3 in accordance with the first embodiment of this invention.

The operation of the remote controller in the first embodiment according to the present invention will be described with reference to flowcharts illustrating operational steps shown in FIGS. 5A and 5B to be performed by the CPU 11 of FIG. 3.

Upon initiation of the program by supplying an electric power, the CPU 11 performs operational steps. It is determined at step S1 whether or not the mode changeover switch 16 has switched to the learning mode I. If it has not, the program returns to the start of the program and step S1 is repeated, whereas if it has, it is determined at step S2 whether or not the light receiving unit 14 has received a light remote control signal from an external remote controller. If it has not, namely, if any signal is not received by the light receiving unit 14 from the external remote controller, the program repeats step S2, whereas if it has, step S3 stores the signal received from the external remote controller by the light receiving unit 14 temporarily in the register 11*a* and the program goes to step S4. For example, when the signal $D_1$ has been applied to the remote controller by the external remote controller, the signal $D_1$ is stored in the register 11*a*.

At step S4, it is determined whether or not the changeover switch 16 is switched to the learning mode II. If it is not, step S4 is repeated, whereas if it is, it is determined at step S5 whether or not an operating key of the operating unit 17 has operated. If it has not, step S5 is repeated, whereas if it has, the program goes to step S6.

Since signals $X_1$, $X_2$, . . . are stored in the ROM 12 correspondingly to the respective keys $K_1$, $K_2$, . . . of the operating unit 17 as shown in FIG. 4A, the signal $X_1$ can be read from the ROM 12 upon operating the key $K_1$ of the operating unit 17. Likewise, the signal $X_1$ is read from the ROM 12 upon operating the key $K_1$ of the operating unit 17 and, at step S6, this read signal $X_1$ is stored, as a key identifying information, into the RAM 13 together with the signal $D_1$ provided by the external remote controller and being stored in the register 11*a* at step S3, as shown in FIG. 4B, and then the program's operation of the CPU 11 will be terminated.

Figure 5B:
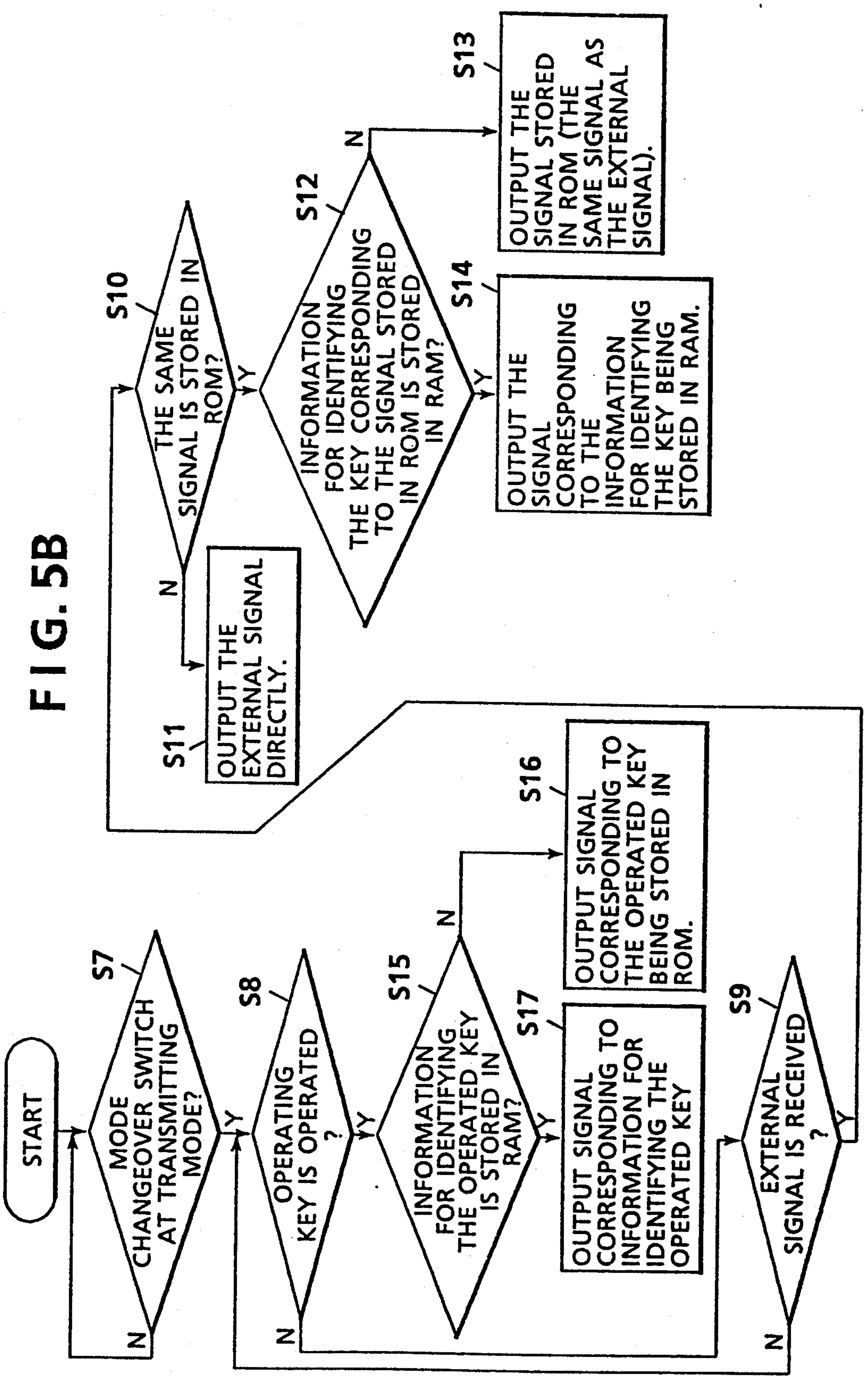

In another program's operation, upon initiation of the program, the CPU 11 determines at step S7 whether or not the mode changeover switch 16 has switched to the transmitting mode as shown in FIG. 5B. If it has not, step S7 is repeated, whereas if it has, it is determined at step S8 whether or not the key of the operating unit 17 has operated. If it has not, it is determined at S9 whether or not any external signal is applied to the light receiving unit 14 or to the input terminal 18. If it has not, namely, if any external signal has not been applied to the light receiving unit 14 or to the input terminal 18, the program returns to step S8 for repeating the step once again, whereas if it has, it is determined at step S10 whether or not the same signal as the input signal is stored in the ROM 12.

If the same signal is not stored in the ROM 12, the light emitting unit 15 emits an infrared remote control signal at step S11 based on the input signal, whereas if it is, namely, when the same signal as the input signal is stored in the ROM 12, it is determined at step S12 whether or not the key identifying information $X_n$ corresponding to the signal in the ROM 12 has been stored in the RAM 13. If it has not, the program goes to step S13 and thereby the light emitting unit 15 emits an infrared remote control signal based on the signal stored in the ROM 12. For example, if a signal $X_2$ is applied to the remote controller from the exterior, the equivalent signal $X_2$ which is identical to the signal applied from the exterior will be derived therefrom. While if it has, the program goes to step S14 and thereby the light emitting unit 15 emits an infrared remote control signal based on a signal which corresponds to the key identifying signal stored in the RAM 13. For example, when the external signal $X_1$ is applied to the remote controller, there is provided a signal $D_1$.

Now back to step S8 again, if a YES condition exists, namely, if the key of the operating unit 17 has been operated, it is determined at step S15 whether or not any information identifying the operated key is stored in the RAM 13. If the condition is NO, the light emitting unit 15 emits an infrared remote control signal at step S16 based on the signal stored in the ROM 12 which corresponds to the operated key, whereby, when the key $K_2$ is operated, a signal $X_2$ is provided for emitting the remote control signal. While if the information identifying the operated key is stored in the RAM 13, the program goes to step 17 and thereby the light emitting unit 15 emits the infrared remote control signal based on a signal stored in the RAM 13 corresponding to the information identifying the operated key. For example, when the $K_1$ is operated, the signal $D_1$ is provided for emitting the remote control signal.

In the first embodiment of this invention as described above, the signal $D_1$ of the different (external) remote controller is stored in the RAM 13 in correspondence with the signal $X_1$ which identifies the specific key $K_1$, and then the stored signal $D_1$ is provided not only in response to the operation of the specific key $K_1$ but to the reception of the external signal $X_1$ fed from the exterior.

Although the remote controller in the first embodiment of this invention has been described with reference to a specific case such that the signal to learn is received through the light receiving unit 14 from the different remote controller, a signal received through the input terminal 18 may also be used for learning.

Similarly, an output signal to be transmitted may be a remote control signal derived from the output terminal 19 instead of the infrared remote control signal emitted by the light emitting unit 15.

A second embodiment of the present invention will be described hereinafter.

Referring to FIGS. 3, 6A and 6B, an infrared remote control signal $R1_1$ is applied to the light receiving unit 14 by a first external remote controller after switching the mode changeover switch 16 to the learning mode I. The infrared remote control signal $R1_1$ received by the light receiving unit 14 is stored temporarily in a register 11*a*. Subsequently, another infrared remote control signal $R2_1$ is applied to the light receiving unit 14 by a second external remote controller after switching the mode changeover switch 16 to the learning mode II. Upon receiving the infrared remote control signal $R2_1$ from the second external remote controller through the light receiving unit 14, the remote control signal $R2_1$ received from the second external remote controller and the remote control signal $R1_1$ temporarily stored in the register 11*a* are fed to the RAM 13 and stored therein in correspondence with each other as shown in FIG. 6A.

When the same external signal as the signal $R2_1$ stored in the RAM 13 is applied to the input terminal 18 or the light receiving unit 14 after switching the mode changeover switch 16 to the transmitting mode, the signal $R1_1$ which corresponds to the signal $R2_1$ is read from the RAM 13 and in turn the light emitting unit 15 emits an infrared remote control signal based on the signal $R1_1$.

When the same signal as the signal $R2_1$ is stored in the ROM 12, which stores a signal corresponding to a key $K_n$ as shown in FIG. 6B, the signal $R1_1$ is read from the RAM 13 when the key $K_n$ of the operating unit 17 is operated, and then the light emitting unit 15 emits an infrared remote control signal based on the read signal of $R1_1$.

Figure 7A:
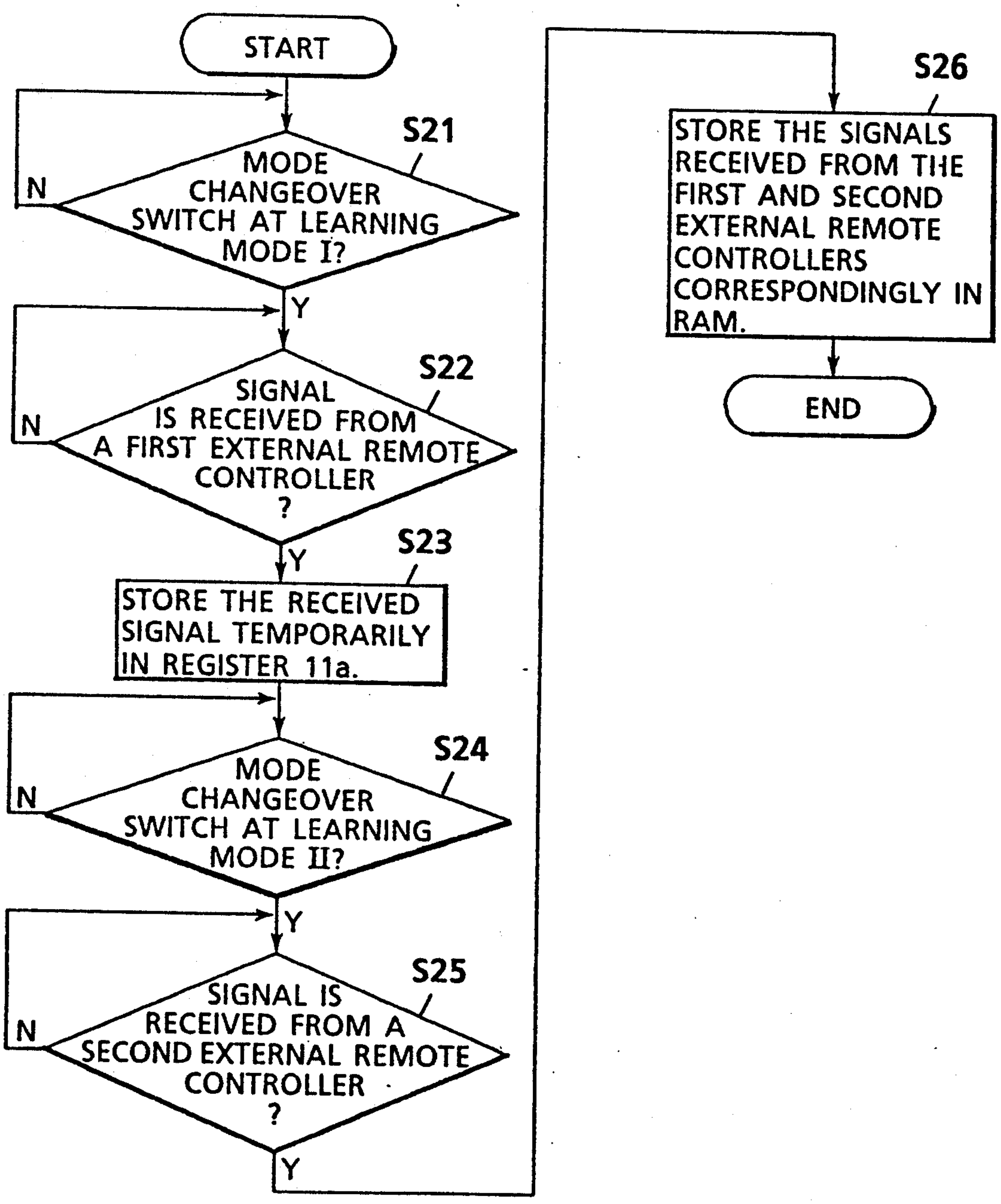
FIGS. 7A and 7B are flowcharts illustrating operational steps to be performed by the CPU of FIG. 3 in accordance with the second embodiment of this invention.
Figure 7B:
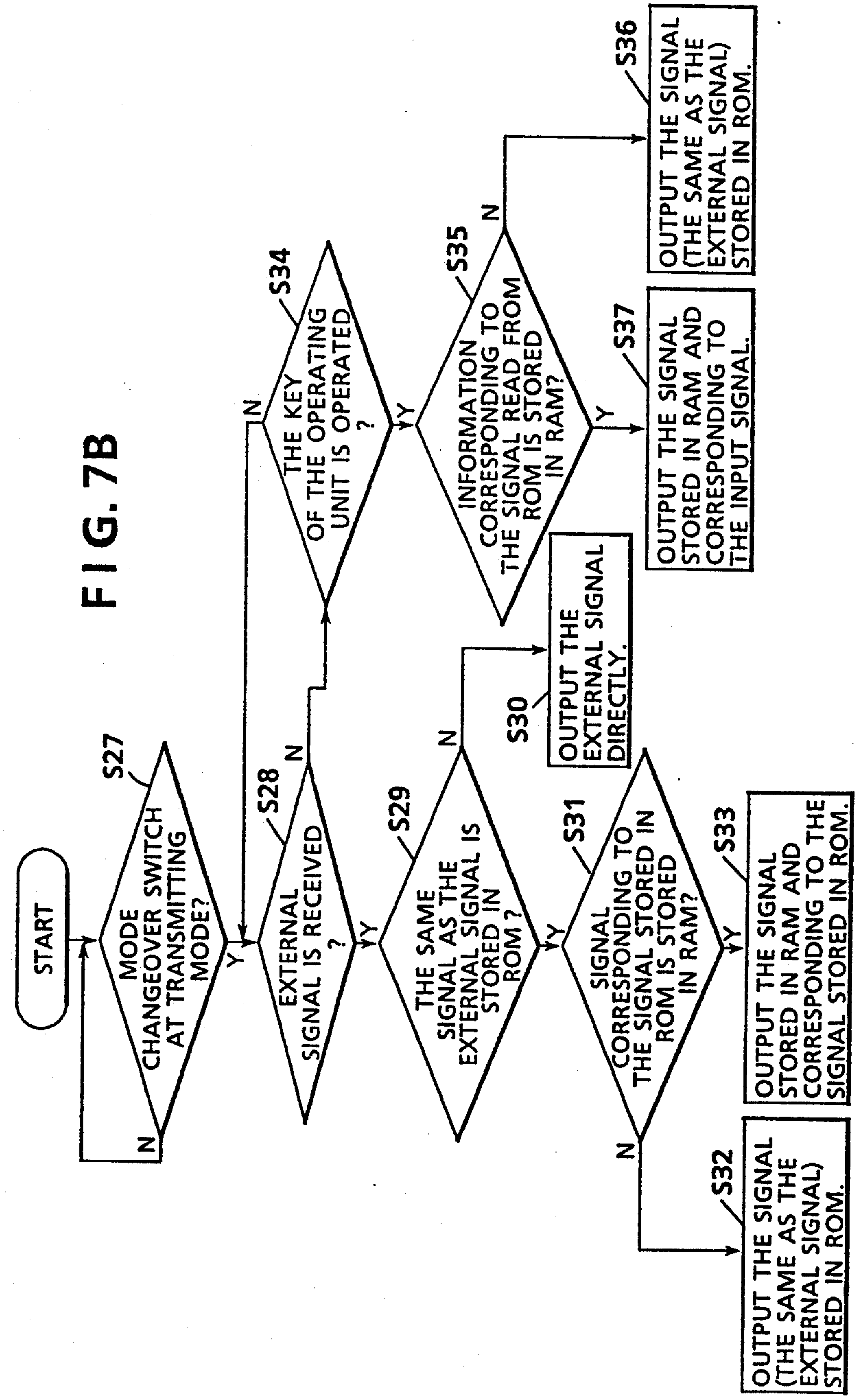

The operation of the second embodiment will be described with reference to flowcharts of FIGS. 7A and 7B to be performed by the CPU 11 shown in FIG. 3.

Upon initiation of the remote controller, the CPU 11 determines at step S21 whether or not the mode changeover switch 16 has switched to the learning mode I. If it has not, step S21 is repeated, whereas if it has switched, it is determined at step S22 whether or not the light receiving unit 14 has received a light signal from the first external remote controller. If it has not, step S22 is repeated, whereas if it has, the signal received from the first external remote controller is stored in the register 11*a* at step S23 and the program goes to step S24. For example, when the signal $R1_1$ is input from the first external remote controller, the signal $R1_1$ is stored in the register 11*a* accordingly.

At step S24, it is determined whether or not the mode changeover switch 16 has switched to the learning mode II. If it has not, step S24 is repeated, whereas if it has, it is determined at step S25 whether or not a signal is received by the light receiving unit 14 from the second external remote controller. If it has not, step S25 is repeated, whereas if it has, namely, when the signal $R2_1$ is received by the light receiving unit from the second external remote controller, the program goes to step S26 and thereby the signal $R2_1$ is stored in the RAM 13 in correspondence with the signal $R1_1$ being stored in the register 11*a* as shown in FIG. 6A, hence the control program to be performed by the CPU 11 is terminated.

Upon initiation of the remote controller, it is determined by the CPU 11 at step S27 whether or not the mode changeover switch 16 has switched to the transmitting mode. If it has not, step S27 is repeated, whereas if it has, it is further determined at step S28 whether or not any external signal has been input to the light receiving unit 14 or to the input terminal 18. If a signal has, namely, if any external signal is applied to the light receiving unit 14 or to the input terminal 18, the program goes to step S29 and thereby it is determined whether or not the same signal as the received external signal is stored in the ROM 12. If it is not, namely, when the same signal as the external signal is not stored in the ROM 12, the light emitting unit 15 emits an infrared remote control signal at step S30 based on the external signal fed from the exterior. While, if the same signal as the signal $R2_1$ is stored in the ROM 12, the program goes to step S31, and thereby it is determined whether or not the signal in the ROM 12 has stored in the RAM 13. If it has not, the light emitting unit 15 emits an infrared remote control signal at step S32 based on the signal stored in the ROM 12, which is the same signal as the input signal, whereas if it has, the light emitting unit 15 emits an infrared remote control signal at step S33 based on the corresponding signal stored in the RAM 13. For example, when the signal $R2_1$ is input from the exterior, the signal $R1_1$ is derived from the RAM 13 for emitting the infrared remote control signal through the light emitting unit 15.

If it is determined at step S28 that any external signal has not been input to the light receiving unit 14 or to the input terminal 18, it is determined at step S34 whether or not the key of the operating unit 17 was turned on. If it has not, the program returns to step S28 for repeating the operational steps, whereas if it has, it is determined at step S35 whether or not information corresponding to the signal read from the ROM 12 is stored in the RAM 13. If it is not, the light emitting unit 15 emits an infrared remote control signal at step S36 based on the stored signal in the ROM 12 corresponding to the operated key, whereas if it is, the light emitting unit 15 emits an infrared remote control signal at step S37 based on the corresponding signal stored in the RAM 13. For example, when the key $K_n$ is operated to turn on, the signal $R1_1$ is derived for exciting the light emitting unit 15.

According to the second embodiment of this invention, the external signal $R1_1$ input from the first external remote controller and the external signal $R2_1$ input from the second external remote controller are stored correspondingly in the RAM 13, and the stored signal $R1_1$ is read therefrom in response to the input of the external signal $R2_1$ or to the operation of a specific key $K_n$.

Although the remote controller in the second embodiment of this invention employs the signal received from the second external remote controller through the light receiving unit 14 for reading out the learned signal, if a signal given in a voice or clap through the input terminal 18 is employed for the same purpose, the learned signal may be read out in response to the voice or clap for transmitting the remote control signal. Further, any input signal from the first remote controller through the input terminal 18 may be substituted for the signal through the light receiving unit 14. Likewise, the remote control signal to be transmitted has been the infrared remote control signal emitted by the light emitting unit 15 in the above described second embodiment, however, any remote control signal such as a voice or clap may be transmitted through the output terminal 19.

A third embodiment of this invention will be described hereinafter. In the third embodiment, the key $K_1$ of the operating unit 17 is operated after switching the mode changeover switch 16 to the learning mode I to read a signal from the ROM 12 and store it temporarily in the register 11*a*. The signal read from the ROM 12 by operating the key $K_1$ after the mode changeover switch 16 has switched to the learning mode I is different from a signal provided by the remote controller in response to the operation of the key under the normal usage in carrying out its primary function. For example, as shown in FIG. 8A, a signal $X_1$ is read from area ROM 1 in response to the operation of the key $K_1$ when the remote controller is in a mode for carrying out its primary function, while a signal $X_1'$ is read from area ROM 2 in response to the operation of the same key $K_1$ when the mode changeover switch 16 is switched to the learning mode I. Subsequently, the key $K_2$ (or the key $K_1$) of the operating unit 17 is turned on after the mode changeover switch 16 is switched to the learning mode II. The key $K_2$ also has predetermined function and, in the learning mode II, a signal $X_2$ stored in a predetermined storage area of the ROM 12 will be read upon operating the key $K_2$. If the signal $X_2$ is read, the read signal $X_2$ and the signal $X_1'$ being stored temporarily in the register 11*a* are transferred to the RAM 13 and stored correspondingly therein as shown in FIG. 8B.

When the key $K_2$ of the operating unit 17 is operated after switching the mode changeover switch 16 to the transmitting mode, the signal $X_1'$ is read from the RAM 13 and in turn the light emitting unit 15 emits an infrared remote control signal based on the signal $X_1'$ being read.

Further, when the same external signal as the signal $X_2$ stored in the ROM 12 is applied to the input terminal 18 or to the light receiving unit 14, the signal $X_1'$ is read from the RAM 13 and then the light emitting unit 15 emits an infrared remote control signal based on the read signal $X_1'$.

Figure 9A:
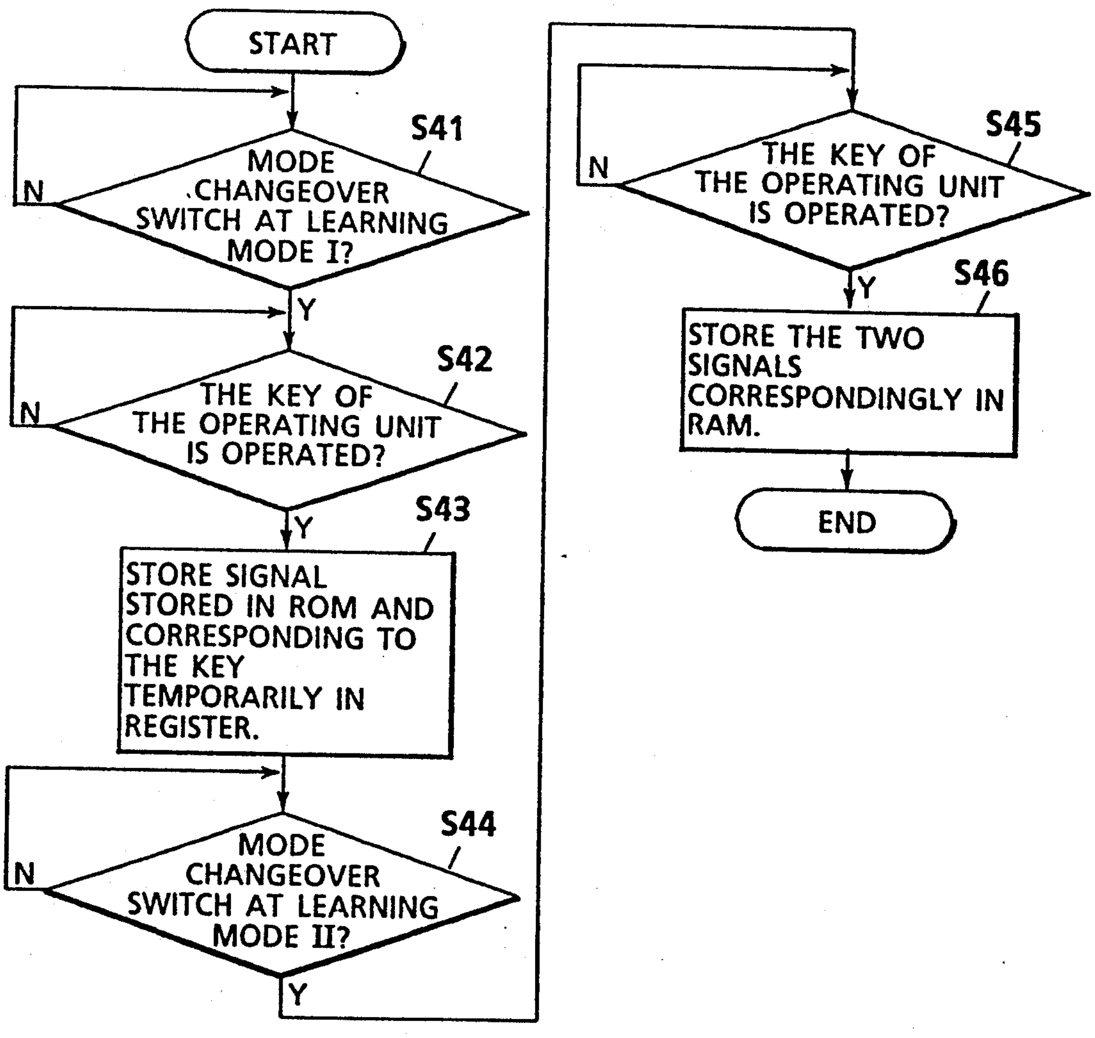
FIGS. 9A and 9B are flowcharts illustrating operational steps to be performed by the CPU of FIG. 3 in accordance with the third embodiment.
Figure 9B:
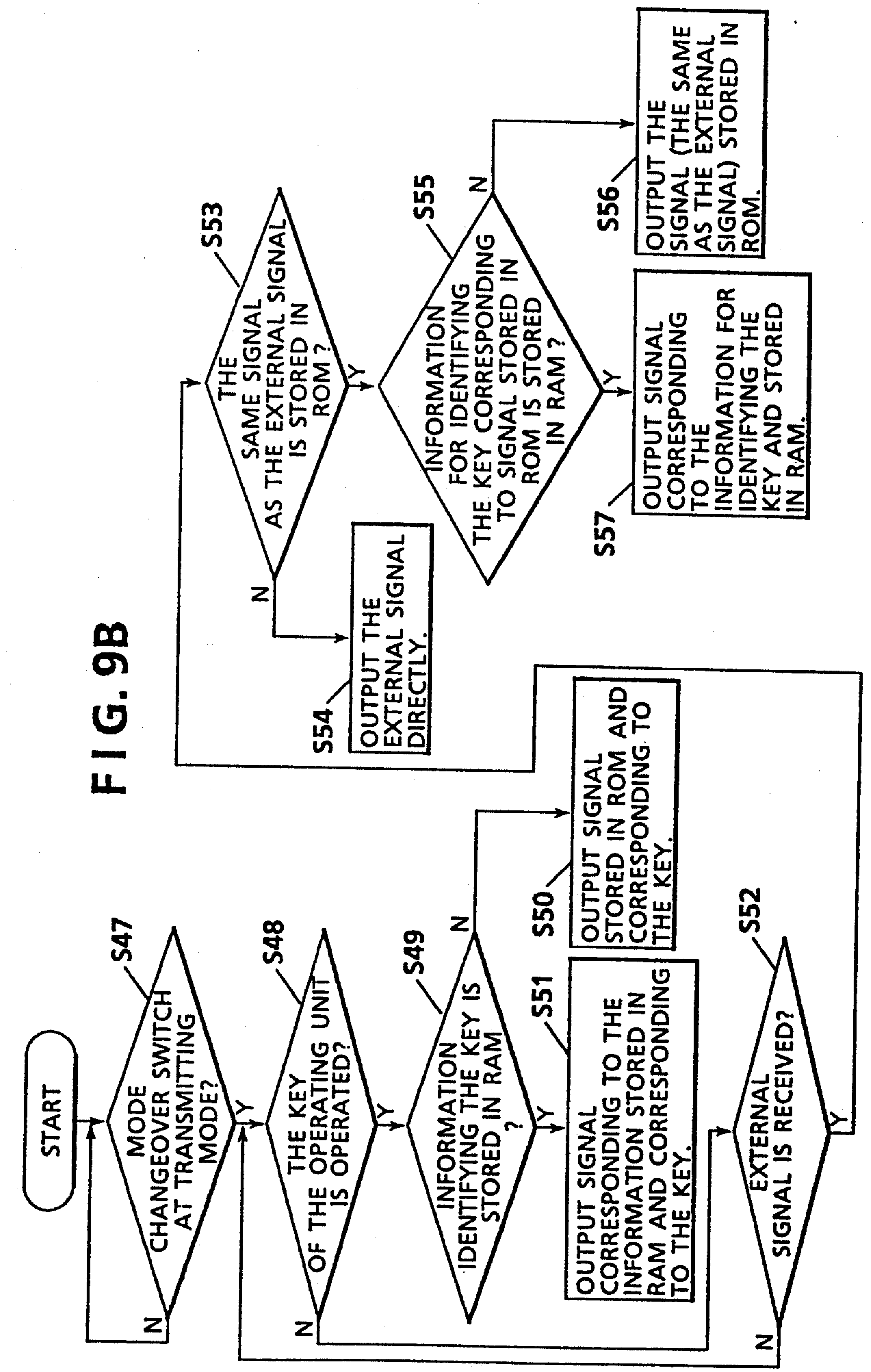

The operation of the third embodiment of the present invention will be described with reference to flowcharts shown in FIGS. 9A and 9B to be performed by the CPU 11.

Upon initiation of the remote controller, it is determined at step S41 whether or not the mode changeover switch 16 has switched to the learing mode I. If it has not, step S41 is repeated, whereas if it has, it is determined at step S42 whether or not the key of the operating unit 17 has operated. If it has not, step S42 is repeated, whereas if it has, the program goes to step S43 and thereby a signal stored in a predetermined storage area ROM 2 of the ROM 12, which corresponds to the operated key, is read therefrom and is stored temporarily in the register 11*a*. For example, when the signal $X_1'$ is read from the ROM 12 at step S43 in response to the operation of the key $K_1$, the signal $X_1'$ will be stored in the register 11*a*.

Then, it is determined at step S44, whether or not the mode changeover switch 16 has switched to the learning mode II. If it has not, step S44 is repeated, whereas if it has, it is determined at step S45 whether or not the key of the operating unit 17 has turned on. If it has not, step S45 is repeated, whereas if it has, the program goes to step S46. If the key $K_2$ has been operated at step S45 and the signal $X_2$ is read from a predetermined area ROM 1 of the ROM 12 in response to the operated key $K_2$, the program goes to step S46 and thereby the signal $X_2$ and the signal $X_1'$ being stored temporarily in the register 11*a* are transferred to the RAM 13 and stored therein in correspondence with each other as shown in FIG. 8B, and then the operational steps of the CPU 11 is terminated.

Upon initiation of the remote controller, the CPU 11 further performs the following operational steps, step S47 determines whether or not the mode changeover switch 16 has switched to the transmitting mode. If it has not, step 47 is repeated, whereas if it has, it is determined at step S48 whether or not an operating key of the operating unit 17 is operated. If it is, the program goes to step S49 and thereby it is determined whether or not a signal for identifying the operated key is stored in the RAM 13. If it is not, step S50 outputs a signal corresponding to the operated key being stored in the ROM 12 and the light emitting unit emits an infrared remote control signal based on the output of the ROM 12, whereas if it is, step S51 outputs the signal corresponding to the operated key being stored in the RAM 13 and the light emitting unit 15 emits an infrared remote control signal based on the output of the RAM 13.

If it is determined at step S48 that any operating key of the operating unit 15 is not operated, it is determined at step S52 whether or not any external signal has been applied to the light receiving unit 14 or the input terminal 18. If it has not, the program returns to step S48, whereas if it has, it is determined at step S53 whether or not the same signal as the applied external signal is stored in the ROM 12. If it is not, step S54 outputs the applied external signal directly and the light emitting unit 15 emits an infrared remote control signal based on the applied external signal, whereas if it is, namely, the same signal as the applied external signal is stored in the ROM 12, it is determined at step S55 whether or not a key identifying signal corresponding to the signal stored in the ROM 12 has stored in the RAM 13. If it has not, step S56 outputs the signal stored in the ROM 12, whereas if it has, the step S57 outputs a signal which corresponds to the key identifying signal from the RAM 13 and the light emitting unit 15 emits an infrared remote control signal based on the output of the RAM 13.

In the third embodiment, the signal $X_1'$, which is generated upon operation of the key of the operating unit 17 under a mode of the remote controller for carrying out a function other than its primary function, and the signal $X_2$, which is generated upon operation of the key of the operating unit 17 under a mode of the remote controller for carrying out its primary function, are stored in correspondence with each other in the RAM 13, and thereby the signal $X_1'$ is output either in response to the signal $X_2$ fed from the exterior or in response to the operation of the key $K_2$ for generating the signal $X_2$.

A fourth embodiment of the present invention will be described hereinafter. In this embodiment, after setting the remote controller to the learning mode I by operating the changeover switch 16, the key $K_1$ of the operating unit 17 is operated for reading a signal from ROM 12 and in turn the read signal is stored temporarily in the register 11*a*. The signal read from the ROM 12 by operating the key in the learning mode I is different from a signal read by operating the key while the remote controller is in the mode for carrying out its primary function. For example, as shown in FIG. 10A, the signal $X_1$ is read from the ROM 1 when the key $K_1$ is operated in the mode for carrying out its primary function, while the signal $X_1'$ is read from the ROM 2 when the same key $K_1$ is operated in the learning mode I.

Subsequently, an infrared remote control signal $R1_1$ is applied to the light receiving unit 14 of the remote controller from an external remote controller after setting the remote controller to the learning mode II by operating the mode changeover switch 16. Upon receiving the signal $R1_1$ at the light receiving unit 14 of the remote controller, the received signal $R1_1$ and the signal $X_1'$ stored temporarily in the register 11*a* are fed to the RAM 13 and stored therein in correspondence with each other as shown in FIG. 10B.

Hence, after changing the remote controller to the transmitting mode by operating the changeover switch 16, if the same signal as the signal $R1_1$ stored in the RAM is received at the light receiving unit 14, the signal $X_1'$ corresponding to the signal $R1_1$ is read from the RAM 13, and then the light emitting unit 15 emits an infrared remote control signal based on the read out signal $X_1'$.

If the same signal as the signal $R1_1$ is stored in the ROM 1 of the ROM 12, the signal $X_1'$ may be read from the RAM 13 in response to the operation of the key which corresponds to the signal $R1_1$, and in turn the light emitting unit 15 emits an infrared remote control signal based on the read out signal.

Figure 11A:
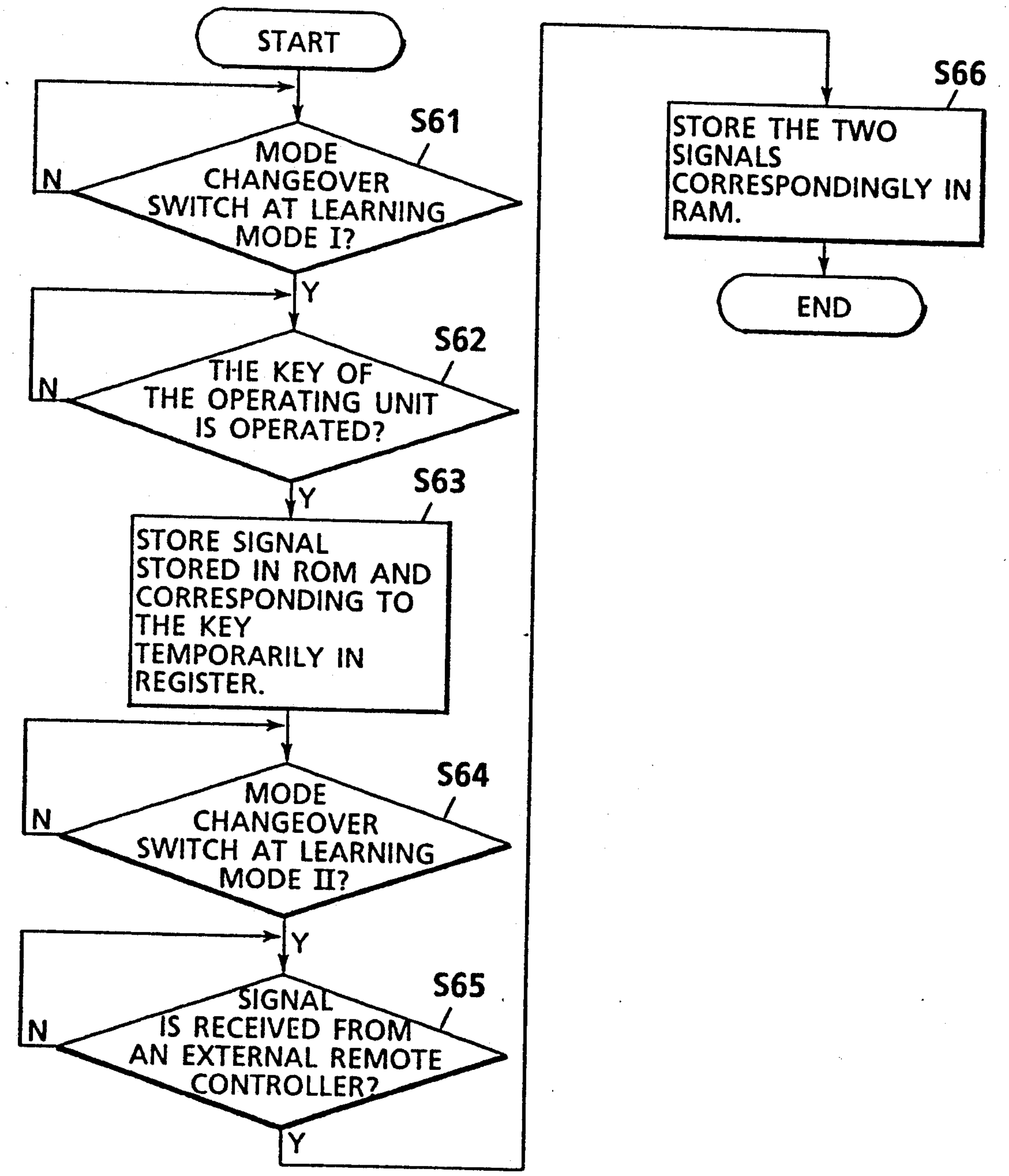
FIGS. 11A and 11B are flowcharts illustrating operational steps to be performed by the CPU of FIG. 3 in accordance with the fourth embodiment.
Figure 11B:
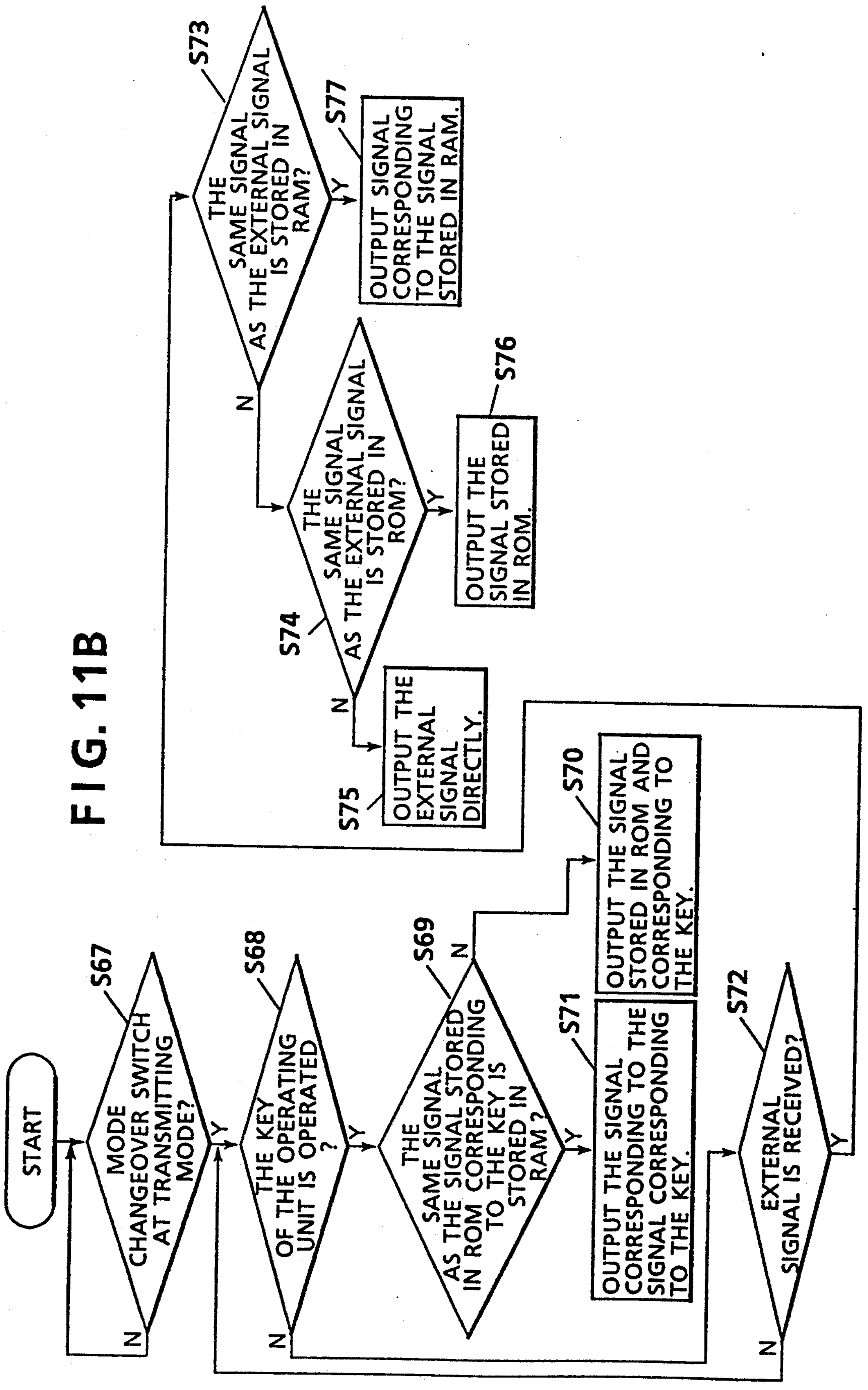

The operation of the remote controller in accordance with the fourth embodiment will be described hereinafter with reference to the flowcharts of FIGS. 11A and 11B to be implemented by the CPU 11 of FIG. 3.

Upon initiation of the remote controller, the CPU 11 determines at step S61 whether or not the mode changeover switch 16 has switched to the learning mode I. If it has not, step S61 is repeated, whereas if it has, it is determined at step S62 whether or not the key of the operating unit 17 has been operated. If it has not, step S62 is repeated, whereas if it has, the program goes to step S63 and thereby a signal stored in the predetermined area ROM 2 of the ROM 12 corresponding to the operated key is read out and stored temporarily in the register 11*a*, and then the program goes to step S64. For example, when the signal $X_1'$ is read from the ROM 2 in response to the operation of the key $K_1$, the signal $X_1'$ is stored temporarily in the register 11*a*.

At step S64, it is determined whether or not the remote controller has switched to the learning mode II by the operation of the mode changeover switch 16. If it has not, step S64 is repeated, whereas if it has, it is determined as step S65 whether or not the remote controller has received a signal at the light receiving unit 14 from another external remote controller. If it has not, step 65 is repeated. whereas if it has, the program goes to step S66. That is, if the signal $R1_1$ is input from the external remote controller, the signal $R1_1$ and the signal $X_1'$ being stored in the register 11*a* are fed to the RAM 13 and stored therein in correspondence with each other at step S66 as shown in FIG. 10B, and then the program of the CPU 11 goes to end.

Further, upon initiation of the remote controller, it is determined at step S67 (FIG. 11B) whether or not the mode changeover switched 16 has switched to the transmitting mode. If it has not, Step S67 is repeated, whereas if it has, it is determined at step S68 whether or not the key of the operating unit 17 has been operated. If it has, namely, when the key of the operating unit 17 has been operated, it is determined at step S69 whether or not the same signal as the one stored in the ROM 12 corresponding to the operated key is stored in the RAM 13. If it is not, the program goes to step S70. Step S70 outputs the signal corresponding to the operated key from the ROM 12 and the light emitting unit 15 emits an infrared remote control signal based on the signal stored in the ROM 12. For example, if the key $K_1$ is operated, the signal $X_1$ will be output since the signal stored in the ROM 12 is $X_1 \neq R1_1$. If it is, at the step S69, step S71 outputs the signal stored in the RAM 13 and the light emitting unit 15 emits an infrared remote control signal based on the signal corresponding to the operated key stored in the RAM 13. For example, if the key $K_1$ is operated, the signal $X_1'$ will be output since the signal $X_1$ corresponding to the operated key is $X_1 = R1_1$.

If it has not, at step S68, namely, when any key of the operating unit 17 is not operated, it is determined at step S72 whether or not any external signal has been applied to the light receiving unit 14 or the input terminal 18. If it has not, the program returns to step S68, whereas if it has, it is determined at step S73 whether or not the same signal as the applied external signal is stored in the RAM 13. If it is not, it is determined at step S74 whether or not the same signal as the external signal has stored in the ROM 12. If it has not, step S75 outputs the applied external signal directly, whereas if it has, step S76 outputs the signal stored in the ROM 12. For example, if the signal $X_1$ is applied to the remote controller, since $X_1 \neq R1_1$, the signal $X_1$ will be output.

If it is, at step S73, step S77 outputs the signal stored in the RAM 13 which corresponds to the external signal. For example, when the signal $R1_1$ is applied to the remote controller, the signal $X_1'$ is derived from the RAM 13.

Accordingly, in the fourth embodiment, the signal $X_1'$, which is generated when the remote controller is in a mode other than the mode for carrying out its primary function upon operating the key of the operating unit 17, and the external signal $R1_1$ fed from the exterior are stored correspondingly, and this stored signal $X_1'$ is output by operating the key which is for generating the same signal as the signal $R1_1$ or by receiving the external signal $R1_1$ from the exterior.

Although the fourth embodiment has described in such that the signal for reading out the learned remote control signal has been the signal received from the external remote controller at the light receiving unit 14, however, a signal applied to the input terminal 18 may also be used for the same purpose.

It is apparent that each of the foregoing remote controllers with learning function, likewise the conventional remote controller with learning functions, can be used independently or incorporated with a product.

As it is obvious from the foregoing description, according to the present invention, a learned remote control signal is stored correspondingly not with an operating key but with a signal for reading the learned remote control signal. Therefore, it is possible to output the learned new remote control signal by operating an operating key assigned to the signal which is for reading out the remote control signal or by inputting the same external signal as the signal which is for reading out the remote control signal, and hence the remote controller with learning function embodying the present invention does not require specific keys for reading the learned remote control signals. Furthermore, the learned new remote control signals can also be read by entering external signals and the operability of the remote controller with learning function is greatly improved.

Further, it is possible to output the learned new remote control signal by inputting the signal which is for reading out the remote control signal from the exterior or by operating an operating key assigned to the same signal as the signal which is for reading out the remote control signal, thus resulting in the same advantages as described above. Furthermore, if new remote control signals to learn and signals for reading out the learned new remote control signals are both input signals from the exterior, a number of remote control signals to learn can be increased independent of the number of operating keys, and signals through different transmission media can also be learned as well as converted in accordance with this invention.

It will be apparent from the foregoing description and drawings that modifications may be made without departing from the spirit and scope of this invention. Accordingly, the present invention is not to be considered to be limited to the specific embodiments illustrated, except insofar as may be required by the following claims.

What is claimed is:

1. A remote controller for transmitting remote control signals, the remote controller having a learning function that allows at least one alternative remote control signal to be stored for subsequent transmission, the remote controller comprising:

an operating unit having a plurality of operating keys;

first storage means, having storage regions corresponding to respective operating keys of the operating unit, for storing a plurality of information control signals respectively corresponding to ones of said plurality of operating keys in respective storage regions;

at least one input means for inputting external signals which are received by the remote controller;

second storage means for storing an information control signal read from a storage region of the first storage means in response to activation of a corresponding operating key, said information control signal thus read being stored in association with an alternative remote control signal input to the input means; and at least one output means for outputting a stored alternative remote control signal read from the second storage means in response to the activation of an operating key which corresponds to a selected information control signal associated with the stored alternative remote control signal in the second storage means, and for outputting the stored alternative remote control signal in response to an input of an external signal substantially the same as the selected information control signal.

2. A remote controller for transmitting remote control signals, the remote controller having a learning function that allows at least one alternative remote control signal to be stored for subsequent transmission, the remote controller comprising:

an operating unit having a plurality of operating keys;

first storage means, having storage regions corresponding to respective operating keys of the operating unit, for storing a plurality of information control signals respectively corresponding to ones of said plurality of operating keys in respective storage regions;

at least one input means for inputting external signals which are received by the remote controller;

second storage means for storing first and second external signals externally applied to the remote controller and received through the input means, in association with each other; and at least one output means for outputting a stored second external signal as an alternative remote control signal read from the second storage means in response to an input of an associated first external signal to the input means, and for outputting the stored second external signal as the alternative remote control signal in response to the operation of a respective one of said plurality of operating keys of the operating unit, which one key corresponds to a storage region of the first storage means storing an information control signal that is substantially the same as the associated first external signal stored in the second storage means.

3. A remote controller for transmitting remote control signals, the remote controller having a learning function that allows at least one alternative remote control signal to be stored for subsequent transmission, the remote controller comprising:

an operating unit having a plurality of operating keys;

first storage means, having storage regions corresponding to respective operating keys of the operating unit, for storing a plurality of information control signals and alternative remote control signals in the storage regions corresponding to respective ones of said plurality of operating keys;

at least one input means for inputting an external signal which is received by the remote controller;

second storage means for storing the information control signals and the alternative remote control signals which are read from the first storage means in response to the activation of the operating keys of the operating unit, respective ones of said information control signals and said alternative remote control signals being stored in correspondence with each other; and at least one output means for outputting one of the stored alternative remote control signals read from the second storage means in response to the activation of a respective operating key of the operating unit which corresponds to the information control signal associated with the stored alternative remote control signal stored in the second storage means, and for outputting the stored alternative remote control signal in response to the input of an external signal to the input means which is substantially the same as the stored information control signal associated with said stored alternative remote control signal in said second memory.

4. A remote controller for transmitting remote control signals, the remote controller having a learning function that allows at least one alternative remote control signal to be stored for subsequent transmission, the remote controller comprising:

an operating unit having a plurality of operating keys;

first storage means, having storage regions corresponding to respective operating keys of the operating unit, for storing information control signals and alternative remote control signals in the storage regions;

at least one input means for inputting at least one external signal which is received by the remote controller;

second storage means for storing an external signal externally applied to the remote controller through the input means and one of the alternative remote control signals read from the first storage means in response to activation of a respective operating key of the operating unit, in correspondence with each other; and at least one output means for outputting a stored alternative remote control signal read from the second storage means in response to the identifying external signal input to the input means stored in the second storage means, and for outputting said stored alternative remote control signal in response to the activation of an operating key corresponding to the storage region of the first storage means that stores an information control signal that is substantially the same as a stored external signal associated with said stored alternative remote control signal corresponding to said operating key thus activated.

* * * * *